//nolink

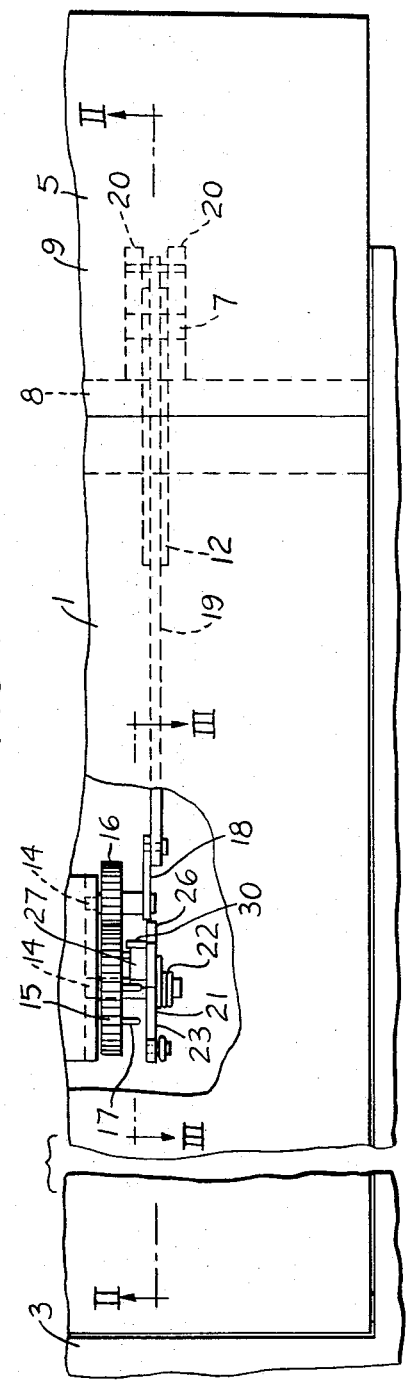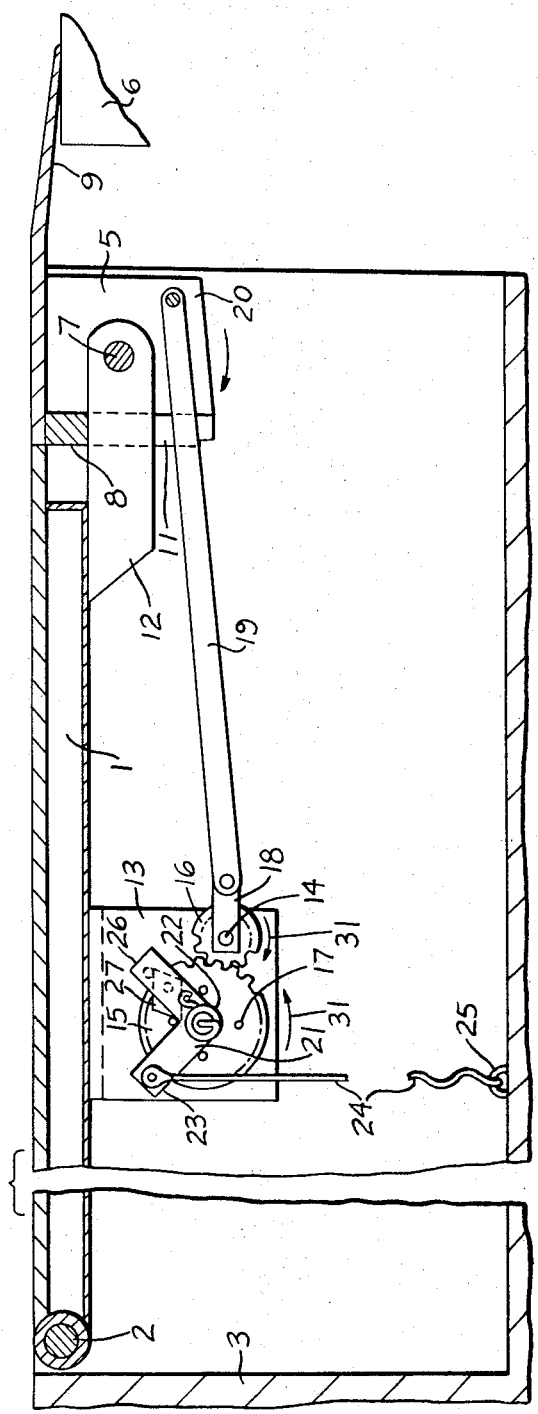

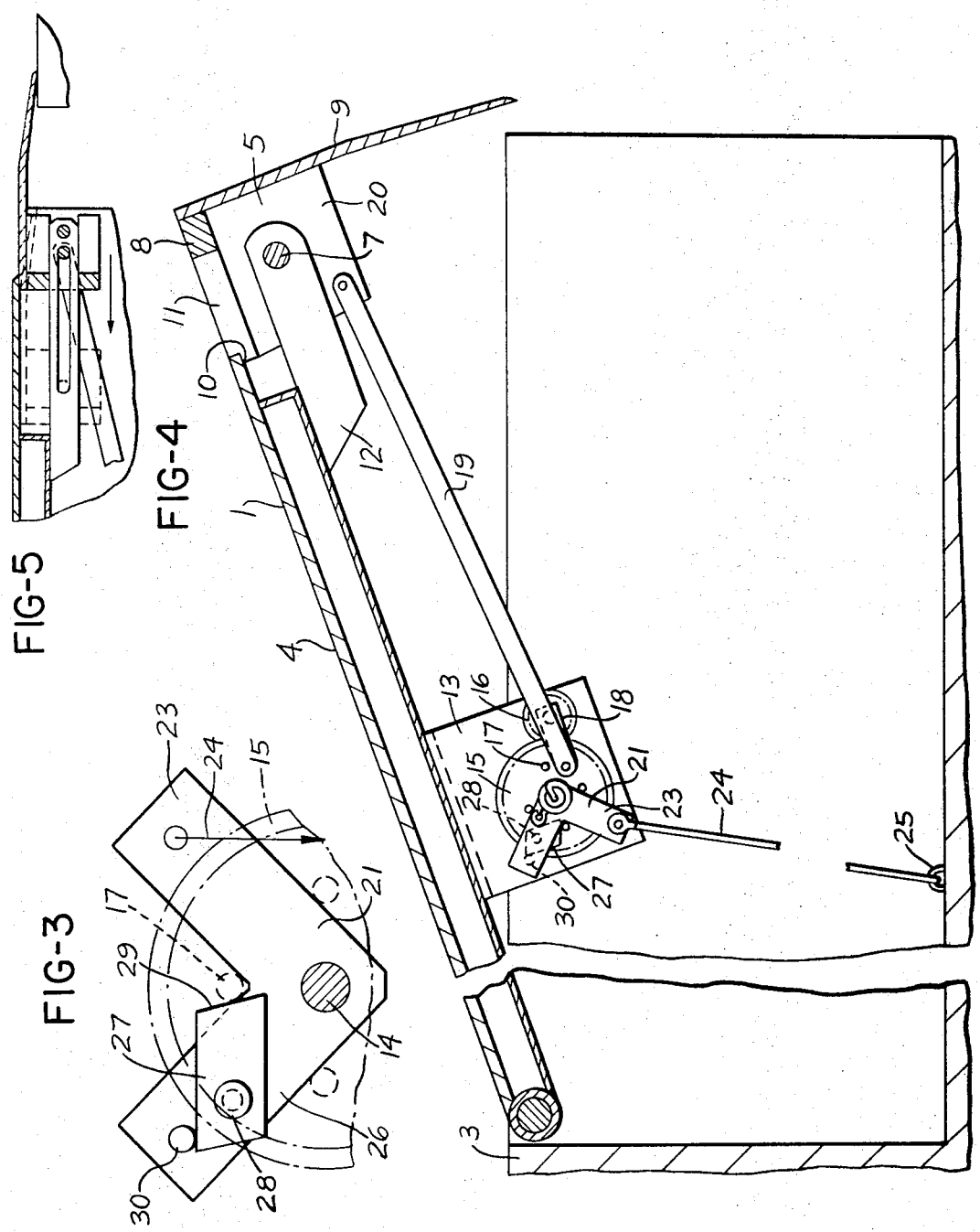

United States Patent Office 3,537,120
Patented Nov. 3, 1970

3,537,120
ADJUSTABLE DOCKBOARD
Kurt Alten, 14 Ringstrasse, 3015 Wennigsen,
Deister, Germany
Filed Mar. 24, 1969, Ser. No. 809,863
Claims priority, application Germany, Mar. 22, 1968,
1,756,032
Int. Cl. B65g 11/00
U.S. Cl. 14—71                                        9 Claims

ABSTRACT OF THE DISCLOSURE

A dockboard for ramps, which is provided with an extension mechanically moveable into an effective and an ineffective position through the intervention of transmission means operable in response to a tilting movement of the dockboard.

---

The present invention relates to an adjustable dockboard with a pivotally mounted bridge plate arranged at the rear end of the ramp and with an extensible and retractable extension at the free end of the bridge plate.

It has been known heretofore to actuate the extension by a cylinder-piston system. To this end, however, particular connections are necessary for the cylinder and the fluid means under pressure.

It is furthermore known to bring about the lifting and lowering of the bridge plate by a cam arranged therebelow, which cam has associated therewith follower means adapted to extend and withdraw the said extension. The actuation of the extension requires a special working medium and in particular an electric motor for moving the said follower.

It is, therefore, an object of the present invention to provide an adjustable dockboard of the above mentioned type which will permit the moving out and moving in of the extension solely by a pivot movement of the bridge plate and will furthermore permit independently thereof a pivoting of the bridge plate by hand or by other driving means for the bridge plate.

This object and other objects and advantages of the invention will appear more clearly from the following specification in connection with the accompanying drawings, in which:

FIG. 1 is a partial top view of an adjustable dockboard for ramps with foldable extension.

FIG. 2 is a section along the line II—II of FIG. 1, while illustrating the platform on which the extension rests during the operation of the dockboard.

FIG. 3 is a partial view of the dockboard according to FIG. 1, said view being taken along the line III—III of FIG. 1.

FIGURE 4 is a section of the dockboard according to FIG. 1 with the bridge plate occupying its upper end position and with the extension folded inwardly, said section being similar to that of FIG. 2, but with the dockboard occupying a different position.

FIG. 5 shows a reciprocable extension.

The problem underlying the present invention has been solved by having the moving out and moving in of the extension effected by a transmission which is journalled on the bridge plate and which is driven by a movement of the bridge plate by means of an actuating member interconnecting the transmission and a stationary bearing. Advantageously, the actuating member is formed by a cable, a chain or the like, which in one position of the bridge plate or dockboard establishes a pull-resistance connection from the stationary bearing to the transmission and drives the latter when a further pivoting movement of the bridge plate is effected.

Preferably, the transmission has a stepping mechanism adapted to be actuated by the actuating member in such a way that whenever the actuating member becomes effective and subsequently the bridge plate or dockboard carries out a certain pivoting movement, the stepping mechanism is actuated whereupon through the transmission there is effected a moving in or out of the extension. The effective length of the actuating member is thus preferably slightly less than the distance of the transmission from the bearing when the bridge plate or dockboard has occupied its position in which the extension is supposed to have moved out or in. This position preferably represents the upper end position so that in view of the present invention, when occupying the upper end position, by means of the bridge plate the extension is either moved outwardly or inwardly. The change in the position of the extension thus is effected shortly prior to reaching the upper end position and is finally completed when the upper end position has been reached.

The employment of the said transmission on the bridge plate and the presence of the above mentioned actuating member thus make possible the operation of the extension by pivoting the bridge plate. The extension may be movable back and forth. Preferably, the invention may also be applied to such dockboards which have their extensions tiltably arranged.

Referring now to the drawings in detail, the bridge plate or dockboard 1 is journalled on ramp 3 by means of a horizontal shaft 2 located at the rear end of said dockboard 1. When not in use, the bridge plate 1 occupies such a position that its surface 4 is at an angle relative to the surface of the ramp. The extension 5 pivotally connected to the free end of the bridge plate 1 will, in this instance, occupy the position shown in FIG. 4. When, however, the dockboard is in operation, the bridge plate 1 rests exclusively by means of the extension 5 on the platform 6 to be loaded or unloaded in such a way (FIG. 2) that the bridge plate 1 will be able to follow possible changes in height of the platform 6 without difficulties. When the dockboard is in its rest position, it rests on a bearing (not shown) on the ramp 3.

The extension 5 is by means of a plurality of joints with bolts 7 journalled on the bridge plate 1 and has a short leg 8 and a long leg 9 which when the dockboard is in operation is located in the plane of the bridge plate 1. If, however, the extension is not in operation as shown in FIG. 4, the long leg 9 occupies a nearly vertical position. The short leg 8 on the other hand, will, when the extension 5 is in its rest position, be located in the plane of the bridge plate 1 and will at 10 rest from below against the bridge plate 1 or on a bearing which may be provided at this area. In operative position shown in FIG. 2, the bottom portion of a slot 11 in the leg 8 rests on a plate 12 which is fixedly connected to the bridge plate 1. Said plate 12 may also surround the bolts 7. In this way a fixed connection is established between the extension 5 and the bridge plate 1 so that the latter can rest on platform 6 exclusively by means of the extension 5. An automatic holding of the extension 5 is brought about by a special weight distribution of the short leg 8 for the two end positions of the extension 5. The weight of the leg 8 is so dimensioned that when said leg 8 is tilted from the above vertical position to the plane determined by the bridge plate 1, a displacement of the center of gravity through the upper dead center point will be effected. The extension will thus hold itself in the two positions according to FIGS. 2 and 4.

The pivoting of the bridge plate 1 may be effected by any desired means, for instance, manually. Preferably, however, the pivoting of the bridge plate 1 is effected by displacing the counterweight pertaining to the bridge plate 1, said counterweight not being shown in the drawing.

At the bottom side of the dockboard 1 there are provided holding means 13 for two parallel axle journals 14 which serve for rotatably journalling two gears 15 and 16. The larger one of these two gears, namely, the gear 15 which has twice as many teeth as the gear 16 has four bolts 17 distributed uniformly over its circumference, whereas gear 16 has connected thereto a crank 18 which by means of a coupling rod 19 is pivotally operatively connected to vertical plates 10 of the extension 5.

On the axle journal 14 for the gear 15 there is furthermore pivotally mounted an angle-shaped follower 21 which through the intervention of a torsion spring 22 is so connected to the axle journal 14 that the spring 20 always urges the follower 21 to move to the position shown in FIG. 2.

A cable 24 or the like is connected to one leg 23 of the follower 21. The lower end of said cable 24 being fixedly connected to a stationary bearing 25 of the ramp 3. The other leg 26 of said follower 21 serves for pivotally journalling a plate 27 with inclined end face or effective face. This pivotal journalling is effected by means of a bearing bolt 28 connected to the leg 26. That end of the plate 27 which faces away from the surface 29 of the follower plate 27 will in the position shown in FIGS. 2 and 3 engage an abutment 30 of the leg 26.

The length of the crank 18 is so dimensioned that when the crank pivots by 180° by means of the coupling rod 19, the extension 5 can move from one end position shown in FIG. 2 to its other end position shown in FIG. 4 and vice versa.

When it is desired to move the dockboard from its position of operation shown in FIG. 2 to its rest position, the plate 1 is tilted upwardly. Shortly before said dockboard 1 reaches its upper end position, the cable 24 is tightened. During the last portion of the pivotal movement, therefore, the leg 23 is held back while a relative pivotal movement of the follower 21 relative to the dockboard 1 will occur and the gear 15 will be turned by 90°. As a result thereof, the gear 16 or the crank 18 journalled thereon will be pivoted by 180° while the extension 5 will be folded over. The end position of the dockboard 1 is illustrated in FIG. 4.

If it is now desired again to move the dockboard to its operative position or to tilt the extension 5 outwardly, the dockboard 1 is again tilted upwardly so that the cable 24 will again tighten, and the gears 15, 16 will turn in the direction of the arrows 31 while taking along the crank 18. In view of the crank turning by an additional 180°, the extension 5 will be pivoted outwardly.

When the dockboard 1 pivots to its upper end position, a working cycle will be carried out. More specifically, the gear 15 will be advanced one step (a 90° angular movement), whereas the gear 16 with the crank 18 will in the same direction be turned by 180°. Furthermore, when the dockboard reaches the upper end position according to FIG. 4, depending on the respective position of the extension 5, the position of said extension 5 will always be changed. Thus, the actuation of the extension 5 is effected by a pivotal movement of the dockboard 1 to its upper end position in cooperation with the above mentioned transmission which operates in the manner of a stepping mechanism effective always in one direction.

In order to bring about a step-wise turning of the gear 15 or to make possible such movement, the follower plate 27 is designed and journalled in the manner explained more clearly in FIG. 3. Inasmuch as this plate 27 during a working cycle of the follower 21 rests against a bearing 30, it will be able by means of the bolt 17 to bring about a rotary movement of the gear 15.

If, however, the follower 21 in view of the torsion spring 22 carries out a rearward tilting movement, the plate 27 can move in the manner of a free pendulum and consequently cannot transmit any force upon the bolt 17.

It is a matter of course that the cable 24 may also be replaced by a chain or a linkage system. These elements, however, have to be so designed that after a certain tilting movement of the dockboard 1, a pull-resistant connection will be established between the transmission and the fixed bearing 25 which is not variable as to its position so that the transmission can be actuated by said elements.

It is, of course, to be understood that the present invention is, by no means, limited to the particular showing in the drawings, but also comprises any modifications within the scope of the appended claims. Thus, instead of employing a drive for the extension 5 to carry out a tilting movement, it is also possible instead to employ a drive for a reciprocatory movement, as illustrated in FIG. 5.

What I claim is:

1. A dockboard for ramps which includes: a main section, means connected to one end of said main section for pivotally connecting the same to a ramp, extension means arranged at the other end of said main section and movable selectively from an ineffective position to an effective position in which said extension means forms an extension of said main section, and vice versa, actuating means supported by said main section and operatively connected to said extension means for selectively moving the same from its effective position to its ineffective position and vice versa, said actuating means including gear transmission means rotatably supported by said main section and also including spring biased and pivotally supported follower means operatively connected to said gear means, and means for connecting said follower means to a stationary holding member.

2. A dockboard according to claim 1, in which said gear transmission means includes step-by-step adjusting mechanism.

3. A dockboard according to claim 2, in which said step-by-step adjusting mechanism is a one-way adjusting mechanism.

4. A dockboard according to claim 1, in which said dockboard is tiltable from a first position in which said extension means is to be effective to an elevated position in which said extension means is to be ineffective, and in which said means for connecting said follower means to a stationary holding member has an effective length slightly less than the distance between said stationary holding member and said gear transmission means.

5. A dockboard according to claim 2, which includes a first gear and a second gear both forming part of said gear transmission means, and in which said step-by-step adjusting mechanism is operatively connected to said first gear for stepwise rotating the same, said second gear meshing with said first gear and the transmission ratio between said first and second gears being such that said second gear is rotated by half a revolution in response to each step carried out by said step-by-step movement of said first gear, and connecting rod means connecting said second gear to said extension means.

6. A dockboard according to claim 5, which includes pawl means pivotally supported by said follower means, and pin means on and connected to said first gear, said pawl means being operable in response to the movement of said follower means in one direction only to engage the respective adjacent pin means and to rotate said first gear by an angle corresponding to half a revolution of said second gear meshing with said first gear.

7. A dockboard according to claim 6, in which said follower means has an abutment engageable by said pawl means in response to the latter engaging one of said pin means for rotating said first gear.

8. A dockboard according to claim 6, in which four pin means are arranged along a circle and spaced from each other by 120°.

9. A dockboard according to claim 6, in which said connecting rod means include a relatively short crank arm pivotally connected to said second gear, and a relatively long rod having one end pivotally connected to said extension means and having its other end pivotally connected to said crank arm, the length of said crank arm and said rod being such that said crank arm is nearly parallel to said main section when the latter is in either one of its end positions.

References Cited
UNITED STATES PATENTS

| | | | |
|---|---|---|---|
| 3,203,002 | 8/1965 | McGuire | 14—71 |
| 3,255,478 | 6/1966 | Lambert | 14—71 |
| 3,316,575 | 5/1967 | Larsen | 14—71 |
| 3,413,671 | 12/1968 | Conner | 14—71 |

JACOB L. NACKENOFF, Primary Examiner